(II-II)

*Inventor:*
GÜNTHER RICHTER
BY
Burgess, Dinklage + Sprung
ATTORNEYS.

(III-III)

Inventor:
GÜNTHER RICHTER
BY
Burgess, Dinklage + Sprung
ATTORNEYS.

(V-V)

Inventor:
GÜNTHER RICHTER
BY
ATTORNEYS.

United States Patent Office 3,609,943
Patented Oct. 5, 1971

3,609,943
SEPARATOR AND PROCESS FOR THE FRACTIONAL DESUBLIMATION OF POLYCARBOXYLIC ACID ANHYDRIDES
Günther Richter, Gladbeck, Germany, assignor to Gelsenberg Benzin Aktiengesellschaft, Gelsenkirchen, Germany
Filed Dec. 9, 1968, Ser. No. 784,284
Claims priority, application Germany, Dec. 9, 1967, P 16 68 161.1
Int. Cl. B01d *59/08;* F28f *13/08*
U.S. Cl. 55—82            14 Claims

ABSTRACT OF THE DISCLOSURE

For the desublimation of acid anhydrides, a heat exchange is provided characterized in that the residence time during the later part of the desublimation is long relative to the residence time during the first part of the desublimation.

According to the state of art, desublimators are used in catalytic gaseous phase oxidation processes, which primarily cool the vapor-gas mixture down to a point above the water dew point created by the process, without the occurrence of any fractionation. These desublimators are mainly designed for the achievement of a good temperature gradient through the selection of certain velocities over finned tube, and the spacing between the rows of finned tubes is selected on the basis of criteria relating to construction and production.

In the thermotechnical design of the prior-art desublimators and hence in determining the heat-exchange areas $$F = \frac{Q}{k \cdot tm} \frac{\text{kcal./h}}{\frac{\text{kcal.}}{\text{cm.}^2 \cdot \text{h} \cdot \text{degree}} \cdot \text{degrees}}$$

average heat transfer numbers of 3 to 10 $\text{kcal.}/\text{m.}^2 \times h \times \text{degree}$ are used, since the heat transfer varies as the incrustation of the finned tubes increases.

It is known that, in the case of the above-named oxidation mixtures, the dew point of the component to be recovered is lower than its melting point and therefore the said component desublimates mostly in the form of a solid substance.

By desublimation is meant the direct transition from the vaporous aggregate state to the solid state.

If the desublimation process is studied with reference to a pressure-temperature diagram, it is known that, when a mixture of vapor and gas cools at a constant pressure lower than its triple-point pressure, crystals do not precipitate immediately when the sublimation curve is passed, just as crystals do not form immediately when a solution is cooled past the saturation curve.

For the performance of the process of the invention, it is necessary not only to achieve a slight supercooling within certain limits, but also to control certain other influential factors, in order to make possible a fractional desublimation which, as mentioned, permits the separation of a fraction of high purity.

One of these influential factors is the time of stay at the dew point.

In oxidation plants of the prior art which operate on a large technical scale, finned-tube heat exchangers and also large chambers are used as desublimators. These are usually followed by expensive purification apparatus (e.g., vacuum stills) for the purpose of arriving at a salable product of high purity.

In the case of some desublimation products, especially pyromellitic acid dianhydride, however, the conventional purification process fail or they produce uneven results. Furthermore, the desublimate of prior art processes, has a tendency to decompose and hence to discolor under thermal stress.

It has now been found that it is possible by fractional desublimation to obtain substantially pure anhydrides from vapor-gas mixtures having a high content of polycarboxylic acid anhydrides if the corresponding surface temperature on the finned tube or at the exchange surface, as the case may be, is adjusted to the corresponding dew point of the desired component. This process is especially suitable for the separation of pyromellitic acid dianhydride. The necessary desublimination temperatures are determined by means of an enthalpy-concentration diagram.

Also, it has been found that the yield can be substantially increased if the surface temperature, in modification of the prior-art procedure, is maintained as the incrustation of the fin-tube surface increases, by varying the heat-carrier conditions within the finned tubes. By varying the logarithmic temperatures difference the temperatures which would otherwise vary at the surface of the finned tubes can be kept constant. If this surface temperature varies upward, the yield diminishes, and if it varies downward, the undesired components are desublimated. Furthermore, snow forms in the desublimator, which also impairs the degree of separation.

Lastly, it has been found that the spacing of the rows of finned tubes from one another, and hence the time of stay at the dew points, has to be determined at least on the basis of the existing degree of saturation, the lower concentrations at the gas output requiring a longer time of stay at the dew point than the greater concentrations at the gas input. The construction of a separating apparatus based on the knowledge disclosed by this invention can involve a spacing of the rows of finned tube that increases as the degree of saturation decreases, in the direction of the gas output.

It is conceivable that, for other reasons, a uniform spacing of the rows of finned tubes may be desirable, but in this case the spacing has to be determined on the basis of the minimum concentration, such as the one that is desired at the gas outlet. Too long a time of stay at the dew points results, from the relative viewpoints, in an excessively large housing. Too short a stay at the dew points, however, impairs the degree of separation.

The desublimators according to the invention are designed on the basis of the following viewpoints: the area of the exchange surface depends on the amount of heat that has to be removed, the temperature at emergence being equal to the dew point temperature of the precise fraction that is desired. The spacing between the rows of finned tubes is best determined on the basis of the initial concentration and the final concentration desired. If a design using uniform fin-tube spacing is preferred, only the desired final concentration should be used in determining the time of stay at the dew points.

In operating the separator according to the invention it is desirable to pay heed to the following: At a given exchange surface area, where the heat transmission cannot be controlled to any great extent, the amount of heat to be removed and hence the temperature inside of the desublimator can be varied only by varying the logarithmic temperature difference. The heat-carrier temperatures at the input and output, and the corresponding quantity of heat, is known on the basis of the design of the exchange surfaces, and so it is a given factor.

Due to the accumulation of product on the heat exchange surface, the gas temperature increases due to the diminishing thermal transfer. This increase in the gas temperatures is prevented according to the invention by the fact that the logarithmic temperature difference is varied to the same extent by reducing at the heat-carrier temperature and/or by increasing the throughput of same. By this method the surface temperature with which the gas stream comes into contact is kept constant. Temperature sensors located in the gas chamber can provide for an entirely automatic control of the required heat-carrier flow.

It has been stated that the polycarboxylic acid anhydride content in the vapor-gas mixture is an important factor in determining the necessary time of stay at the dew point. Particularly in the case of vapor-gas mixtures having a high content of pyromellitic acid dianhydride, the initial concentration is substantially lower than it is, for example, in the case of the production of phthalic acid anhydride. The result is that the desublimators for the separation, especially, of pyromellitic acid dianhydride require, according to the invention, a greater fin-tube spacing in order to achieve equal or better degrees of separation.

The invention is further explained in the drawings by disclosure therein of a number of embodiments.

Figure 1:
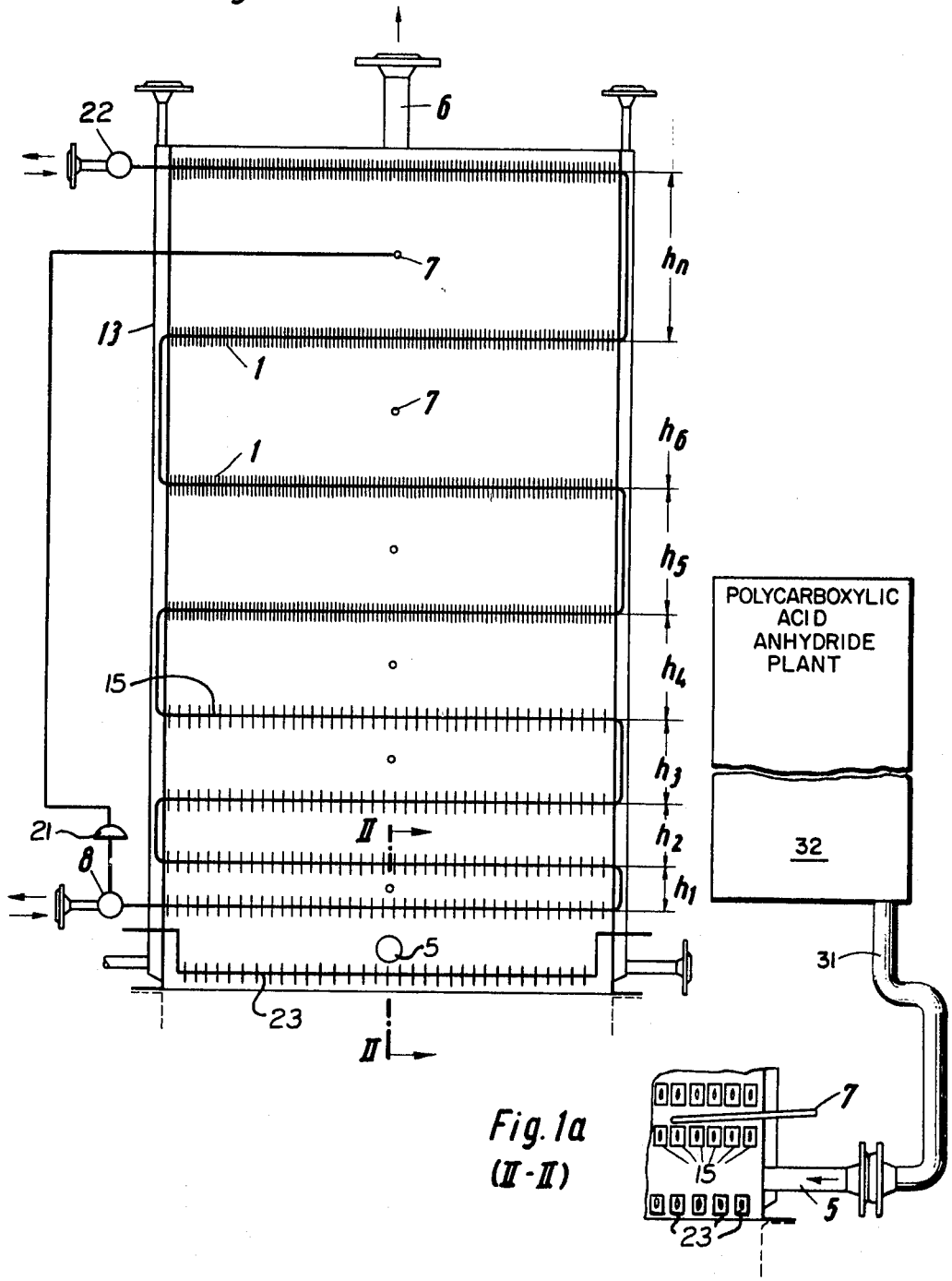
FIG. 1 is a longitudinal cross-section through a box-like desublimator.

In the drawings, the heat exchanger systems are designated as 1, 2, 3 and 4, the gas input as 5, the gas output as 6, the temperature sensors as 7, the header pipes as 8, 9, 10 and 11, the desublimator housing as 12, the double jacket as 13, the fins as 14 and the fin tubes as 15. A heating coil 23 is disposed in the bottom of the housing 12 for heating product melted on the coils is to remove it therefrom.

Figure 1A:
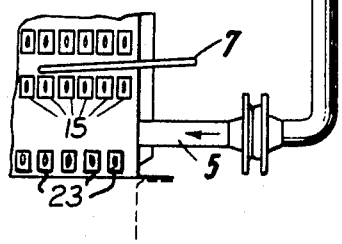
FIG. 1a is a cross-section on line II—II of FIG. 1 or FIG. 2.

According to FIG. 1, a heat exchanger system 1, consisting of a plurality of fin tubes 15 each lying in the same plane, which are connected to a header 8, and at the other end to another header 22, is disposed inside of the upstanding desublimator housing 12 which has a box-like cross-section. An important aspect of this apparatus is the vertical spacing of the rows of the parallel fin tubes, which increases from the gas input 5 to the gas output 6 ($h_1$–$h_1$). Header 8 is outfitted with a control valve 21 which is connected with the temperature sensors 7 for varying the flow of the coolant to maintain constant temperature conditions in the heat exchanger. The inlet 5 of the heat exchanger is connected via line 31 with the polycarboxylic acid anhydride plant 32 to receive the effluent from said plant, as can be seen in FIG. 1a.

Figure 2:
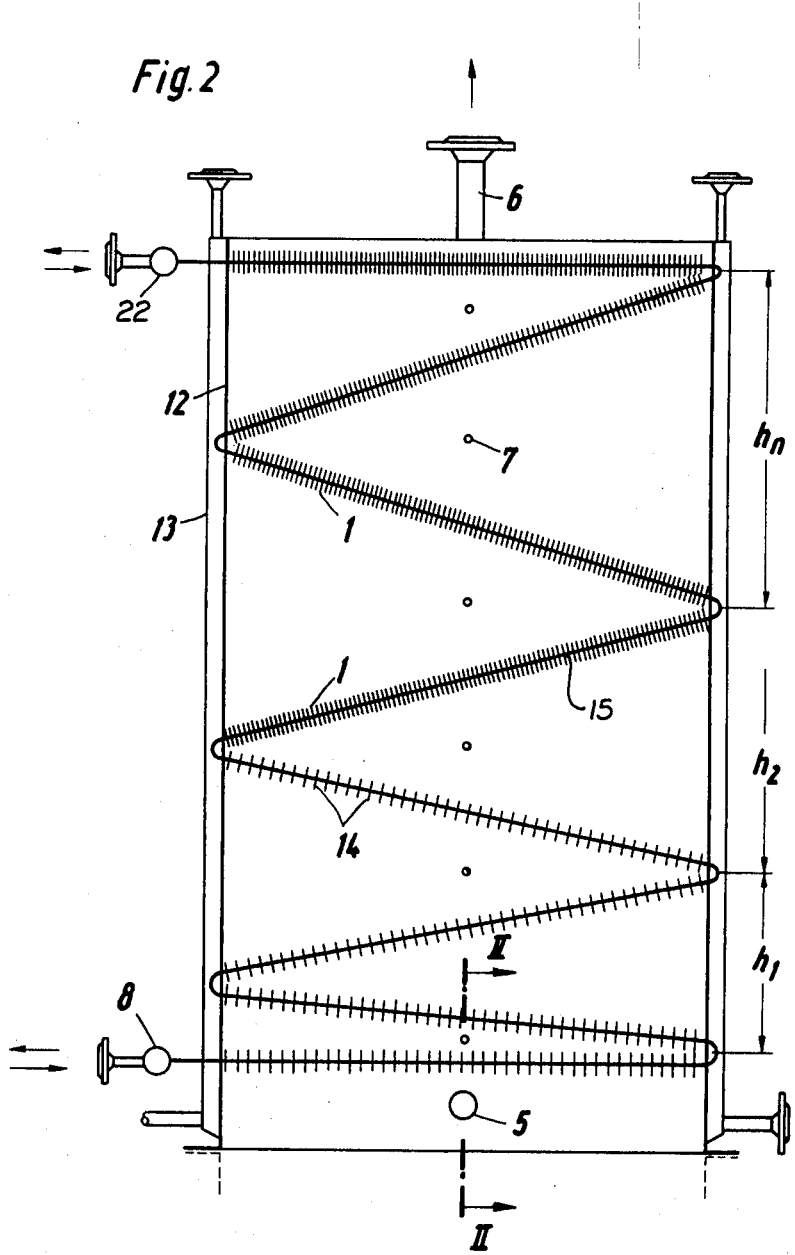
FIG. 2 is another embodiment of the invention.

The apparatus of FIG. 2 is constructed on the same principle as the apparatus of FIG. 1. The important thing in this apparatus, however, is the slanting arrangement of the fin tubes 15. The position of fins 14 can be at right angles either to the tubes 15 or to the housing 12. In this apparatus, too, the spacing ($h_1$–$h_n$) between the rows of fin tubes increases from the gas input 5 to the gas output 6.

Figure 3:
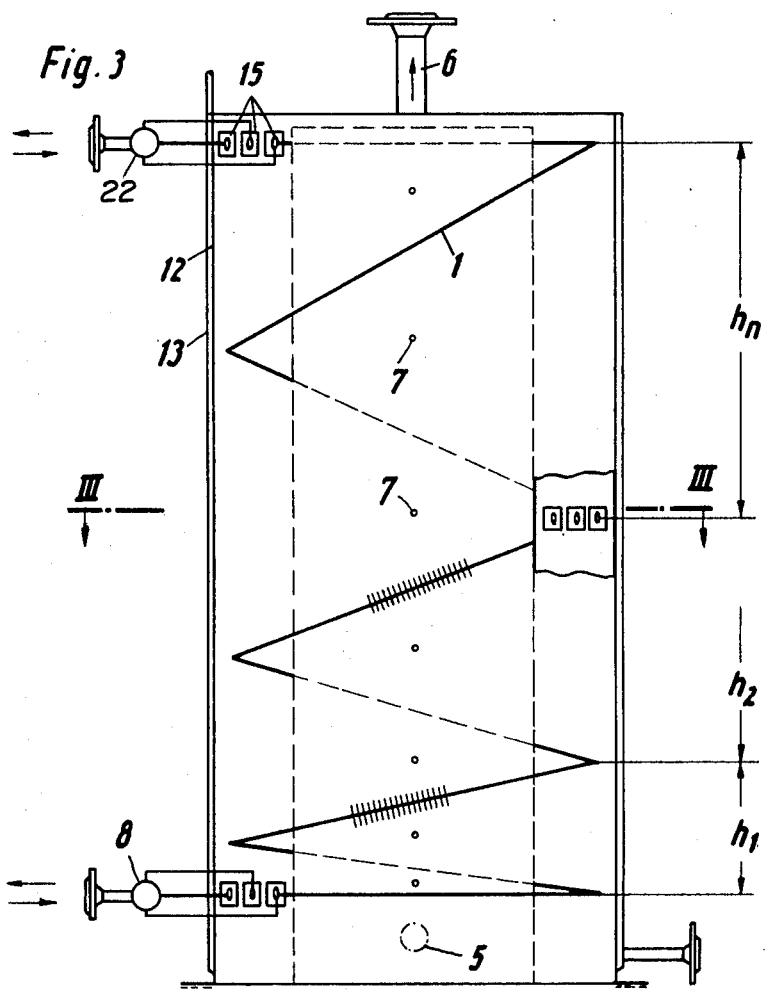
FIG. 3 is a longitudinal section through a round desublimator.
Figure 3A:
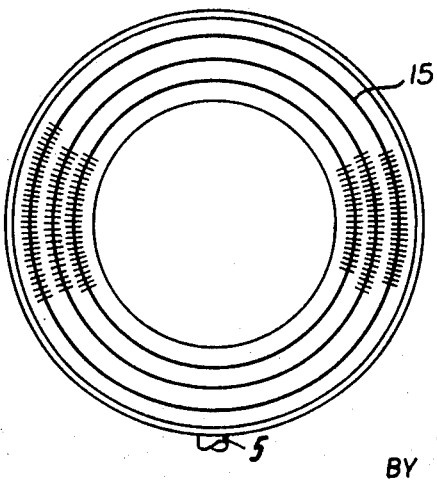
FIG. 3a is a cross-section on line III—III of FIG. 3.

The apparatus in FIG. 3 illustrates the arrangement of a heat exchanger system 1 having a plurality of fin tubes 15 wound in spirals; these tubes are connected to a header pipe 8 and empty back into a similar header 8. The important thing in this apparatus is the increasing pitch ($h_1$–$h_n$) of the spirals 15 from the gas input 5 to the gas output 6. Otherwise, the apparatus is constructed on the same principle as the apparatus of FIG. 1.

Figure 4:
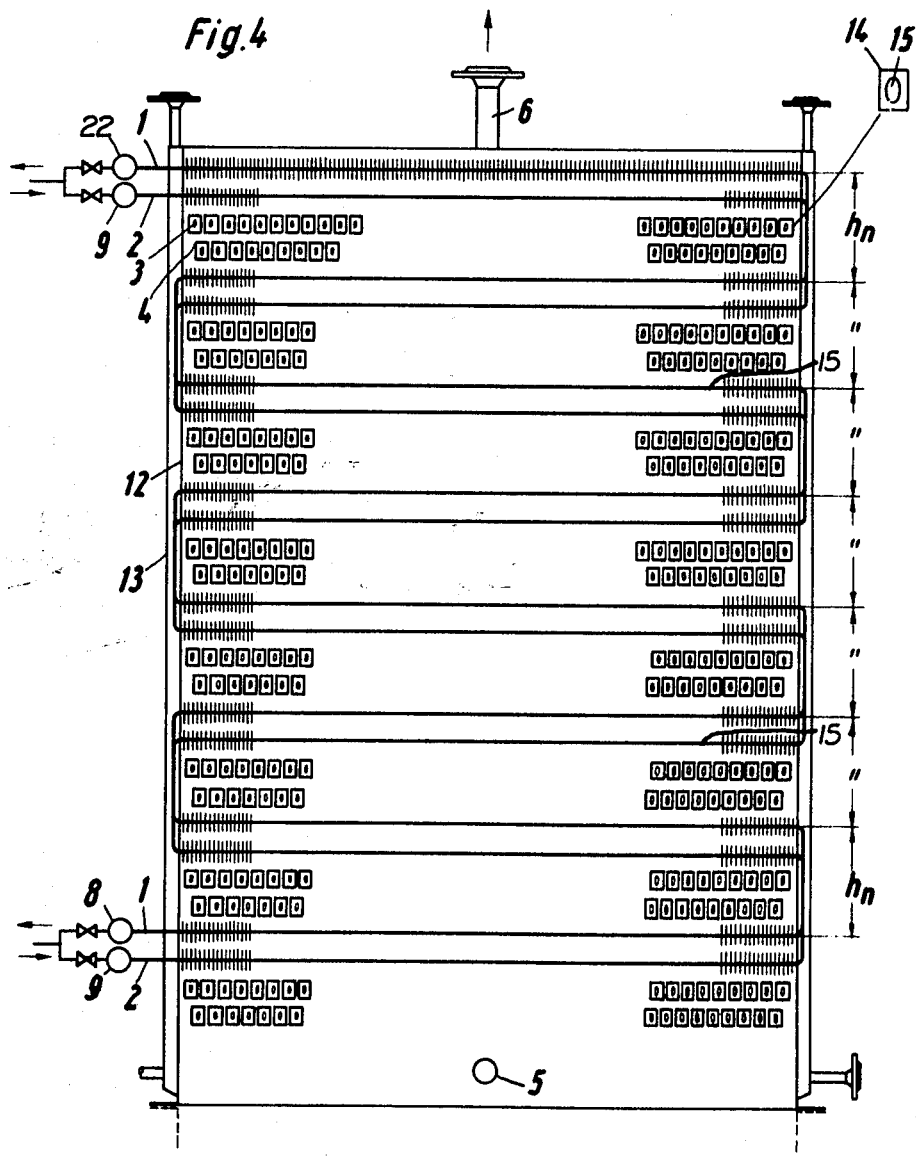
FIG. 4 is a longitudinal section through a box-desublimator having four heat exchange systems in it.
Figure 4A:
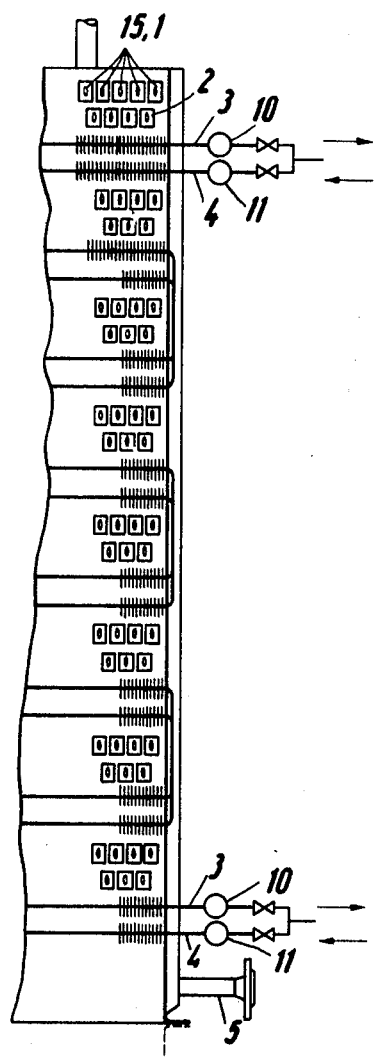
FIG. 4a is a detail of the side elevation of the desublimator of FIG. 4.

In FIGS. 4 and 4a, four heat exchanger systems, 1, 2, 3, 4, are arranged within the upright desublimator housing 12 which has a box-like cross-section; each of these systems consists of a plurality of fin tubes 15 lying on the same plane, which are connected each to a header pipe 8, 9, 10, 11, at one end, and empty back at the other end into a header pipe 8, 9 (FIG. 4) 10, 11 (FIG. 4a). The heat exchanger systems 3 and 4 are arranged at right angles to heat exchanger systems 1 and 2. The important thing in this apparatus is the spacing $h_n$ of the fin tubes, which has been determined on the basis of the desired concentration at the gas output 6, and has been kept deliberately the same through the entire desublimator, since another three heat exchanger systems 2, 3 and 4 are also arranged at these relatively great intervals. The systems 1, 2, 3, 4 can be dependent or independent of each other.

Figure 5:
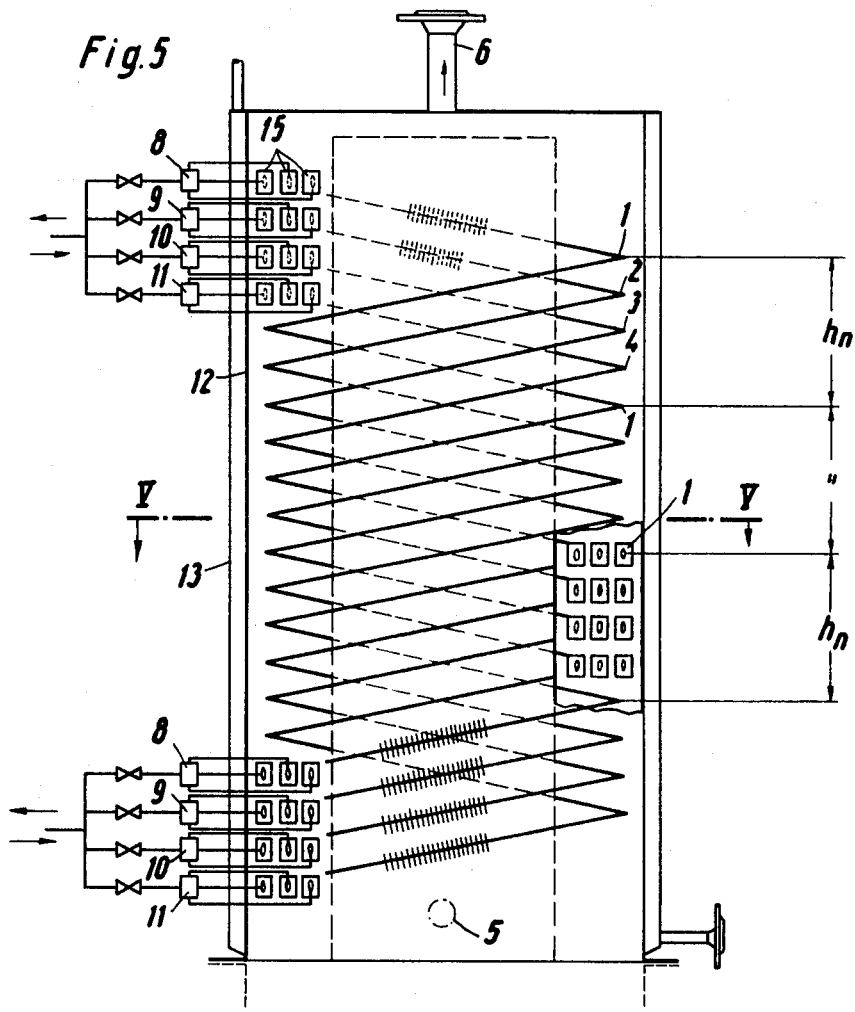
FIG. 5 is a longitudinal section through a round desublimator incorporating four heat exchanger systems.
Figure 5A:
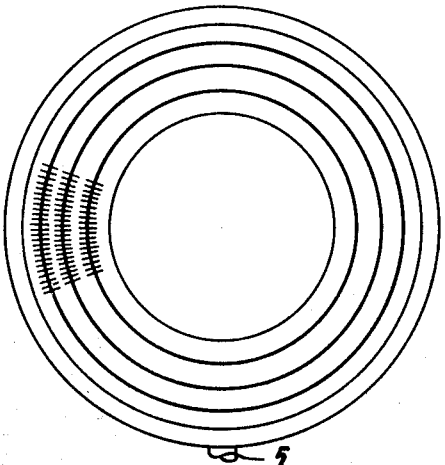
FIG. 5a is a cross-section on line V—V of FIG. 5.

The apparatus of FIG. 5 has an arrangement of a plurality of heat exchanger systems 1, 2, 3, 4, in an upright desublimator housing 12 of round cross-section. The important thing in this apparatus, as in the apparatus according to FIG. 4, the fin tube spacing $h_n$ and hence the arrangement of additional heat exchanger systems at these intervals $h_n$. Systems 1, 2, 3, 4 can be dependent or independent of each other.

The action of the desublimators according to FIGS. 4 and 5 can be the following:

The vapor-gas mixture flows from the gas input 5 toward the gas output 6. In both apparatus, four exchange systems, for example, are housed. The heat transfer medium (e.g., Marlotherm, Diphyl, registered trademarks of Chemische Werke Huels G.m.b.H., Marl, and Farbenfabriken Bayer, Leverkusen), however, flows through only one coil at a time, so that no transfer of heat occurs at the remaining three coils. When a coating has formed on this coil, so that no economical heat exchange can occur, the next coil is put into operation, and so on. When finally all coils are covered with a coating, the coating can be melted off in a process step using the same or a reversed direction of flow, in a known manner.

In general the spacing between the cooling tube rows are determined according to the following values. As the effect is due to the dew point residence time and on the other hand this residence time is the basis for the spacing of the cooling tube rows, the following relations may be given for the construction of the apparatus in view of the spacing of the tube rows. The dew point residence time is to be varied as the concentration of the anhydrides in the gas varies:

| Gr./Nm.$^3$·h | | Dew point residence time, sec. |
| --- | --- | --- |
| 40 | 0.1–0.6 | preferably 0.3–0.4. |
| 20 | 0.4–1 | preferably 0.6–0.7. |
| 10 | 0.8–4 | preferably 1–2. |
| 2 | 3–6 | preferably 4–5. | and interpolated values.

In the case of a separator according to FIG. 5 of the drawings, wherein the spaces of the cooling tube rows are equal throughout the apparatus, it is essential in view of this invention that the spacing of the rows adjacent to the gas outlet are determined according to the long dew point residence time necessary for the desired low concentration of anhydrides in the gas leaving the apparatus.

This and further characteristics will become more apparent by the following examples:

EXAMPLE I

As it is not necessary to rely upon exact mathematic deduction the teaching of the invention can be empirically performed as is shown in the following:

A gas-vapour mixture containing 20 gr./Nm.$^3$·h polycarboxylic anhydride comprising a fraction of 85% PMDA is to be handled that a PMDA is desublimated, having a high percentage purity which makes an after-purifying superfluous. For the desublimation a separator is used of a type as shown in FIG. 1 to FIG. 3 of the drawings.

The housing of the desublimator has a width of 1 meter (m.), a breadth of 0.3 m. and a height of 1.8 m. From the cross section of 0.3 m.$^2$ and the height a total residence time is calculated with 25 seconds for 76 Nm.$^3$/h. of the mixture. The temperature of said mixture at the inlet is 250° C., at the outlet 130° C. According to the formula on column 1, lines 35 to 40 of this specification the heat exchange area is calculated to the 30 m.$^2$ (to cool from 250° C. to 130° C.). Under varying the spacing between adjacent rows of cooling tubes it is achieved that 80% of the 85% PMDA contained in the mixture is desublimated with a purity percentage of more than 98%.

The rows of cooling tubes are varied from the inlet to the outlet (the resulting residence time is added in round brackets):

(0.55 sec.):
$h1$—0.040 m.
$h2$—0.060 m.
$h3$—0.080 m.
$h4$—0.10 m.
$h5$—0.12 m.
$h6$—0.14 m.
$h7$—0.16 m.
$h8$—0.18 m.
$h9$—0.20 m.
$h10$—0.22 m.
$h11$—0.24 m.
(3.6 sec.):
$h12$—0.26 m.

Relative to the decreasing spaces between the cooling tubes the residence time decreases from cooling tube row to cooling tube row and contrary the saturation degree of the polycarboxylic anhydride decreases so that after the 12th row it is but 6.4 gr./Nm.$^3$ and consists substantially of impurities (semi-oxidates).

EXAMPLE II

The desublimator according to Example I may be interchanged by a desublimator according to FIG. 5. In this case the space $h12$ of the desublimator of Example I is not only applied near the outlet of the desublimator but throughout the housing, i.e. that all spaces ($h1$ to $h12$) are 0.26 m. high. The total height of the desublimating separator is now 3.2 m.

In order to increase the utilisation factor it is advisable to fill the large spaces between the cooling tubes of one heat exchange system with more equal systems. In the case of this example four systems (8, 9, 10, 11 in FIG. 5) are present. All systems then have a distance from one another of one-fourth of 0.26 m., that is 0.065 m.

What is claimed is:
1. In combination with a plant for production of a gas phase effluent containing a component which can be recovered from the gas effluent by desublimation, having an effluent conduit for discharge of the gas phase effluent from the plant, a separator for fractional desublimation to separate said component as a fraction of high purity, comprising:
  (a) an elongated housing having an inlet connected to said effluent conduit for receiving said gas and for introduction of the gas adjacent one end of the housing and an outlet for discharge of the gas adjacent the other end of the housing;
  (b) heat exchange tubes in the housing disposed transversely of the path of the gas at spaced intervals from the inlet to the outlet;
characterized in that:
  (c) the spacing of the heat exchange tubes is large for the tubes adjacent the gas outlet, relative to the spacing of the heat exchanger tubes adjacent the gas inlet, so that the residence time is increased as the degree of saturation of the component in the gas is decreased from gas inlet to gas outlet.

2. Apparatus according to claim 1, said plant being for the production of polycarboxylic acid anhydride.

3. Separator according to claim 1 wherein the heat exchange tubes are finned tubes.

4. Separator according to claim 1 wherein the heat exchange tubes include tubes serially connected disposed in parallel and in a single plane (e.g. FIG. 1).

5. Separator according to claim 1 wherein the heat exchange tubes include tubes serially connected disposed in a single plane and which together zig-zag from adjacent the inlet to adjacent the outlet.

6. Separator according to claim 1 wherein there is a plurality of groups of said tubes, the tubes of each group being disposed in a plane extending from the gas inlet to the gas outlet and being serially connected.

7. Separator according to claim 1 wherein there is a plurality of groups of said tubes, the tubes of each group being serially connected and disposed in a cylindrical surface extending from adjacent the gas inlet to adjacent the gas outlet.

8. Separator according to claim 1 wherein the spacing of the heat exchange tubes progressively increases from a minimum $h_1$ at the tube rows nearest the gas inlet to a maximum $h_n$ nearest the gas outlet.

9. Process for desubliming a component contained in a gas which comprises:
  (a) introducing the gas into a separator comprising an elongated housing having an inlet end and an outlet end, for passage of the gas through the housing from the inlet end to the outlet end,
  (b) cooling the gas progressively as it passes from the inlet end to the outlet end by indirect heat exchange through heat exchanger tubes spaced in the housing for an increase in the residence time of the gas at the sublimation temperatures as the gas passes from the inlet end to the outlet end,
  (c) thereby desubliming the gas and depositing the sublimate on the tubes.

10. Process according to claim 9 wherein said component is a polycarboxylic acid anhydride and the residence time increase is correlated with the content of anhydride in the gas, as follows:

| Gr. anhydride/Nm.$^3$·h | Residence time, sec. |
| --- | --- |
| 40 | 0.1–0.6 |
| 20 | 0.4–1 |
| 10 | 0.8–4 |
| 2 | 3–6 |

11. Process according to claim 9 wherein said component is a polycarboxylic acid anhydride and the residence time increase is correlated with the content of anhydride in the gas, as follows:

| Gr. anhydride/Nm.$^3$·h | Residence time, sec. |
| --- | --- |
| 40 | 0.3–0.4 |
| 20 | 0.6–0.7 |
| 10 | 1–2 |
| 2 | 4–5 |

12. Process according to claim 9, said component being polycarboxylic acid anhydride.

13. Process according to claim 9 wherein the heat transfer in the separator is maintained constant during the sublimation by modifying the flow-condition of a coolant in the heat exchange tubes to compensate for increasing encrustation on the heat exchanger tubes during the sublimation.

14. Process according to claim 9, wherein the anhydride is pyromellitic acid dianhydride.

References Cited

UNITED STATES PATENTS

| | | | |
|---|---|---|---|
| 2,150,678 | 3/1939 | Fisher | 165—39 |
| 2,955,807 | 10/1960 | Riley et al. | 55—82 X |
| 2,455,314 | 11/1948 | Pietzsch | 55—82 X |
| 3,084,914 | 4/1963 | Davis | 165—146 X |

FOREIGN PATENTS

| | | | |
|---|---|---|---|
| 590,336 | 7/1947 | Great Britain | 165—39 |
| 794,450 | 5/1958 | Great Britain | 55—269 |

ALBERT W. DAVIS, Jr., Primary Examiner

U.S. Cl. X.R.

55—269; 165—39, 111, 147